(12) United States Patent
Kuroda et al.

(10) Patent No.: US 12,482,823 B2
(45) Date of Patent: Nov. 25, 2025

(54) CONDUCTIVE MATERIAL LIQUID DISPERSION, POSITIVE ELECTRODE SLURRY FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(71) Applicant: Panasonic Intellectual Property Management Co., Ltd., Kadoma (JP)

(72) Inventors: Kosuke Kuroda, Osaka Fu (JP); Youichirou Uka, Hyogo Ken (JP); Koh Masahara, Hyogo Ken (JP); Tomohiro Harada, Osaka Fu (JP); Rina Yamamoto, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/284,205

(22) PCT Filed: Mar. 30, 2022

(86) PCT No.: PCT/JP2022/016073
§ 371 (c)(1),
(2) Date: Sep. 26, 2023

(87) PCT Pub. No.: WO2022/210902
PCT Pub. Date: Oct. 6, 2022

(65) Prior Publication Data
US 2024/0178396 A1 May 30, 2024

(30) Foreign Application Priority Data
Mar. 31, 2021 (JP) .................. 2021-061192

(51) Int. Cl.
*H01B 1/20* (2006.01)
*C09D 5/24* (2006.01)
*C09D 7/40* (2018.01)
*C09D 7/45* (2018.01)
*C09D 7/61* (2018.01)
*C09D 7/65* (2018.01)
*C09D 139/06* (2006.01)
*H01M 4/131* (2010.01)
*H01M 4/525* (2010.01)
*H01M 4/62* (2006.01)

(52) U.S. Cl.
CPC .............. *H01M 4/622* (2013.01); *C09D 5/24* (2013.01); *C09D 7/45* (2018.01); *C09D 7/61* (2018.01); *C09D 7/65* (2018.01); *C09D 7/70* (2018.01); *C09D 139/06* (2013.01); *H01B 1/20* (2013.01); *H01M 4/131* (2013.01); *H01M 4/525* (2013.01); *H01M 4/625* (2013.01)

(58) Field of Classification Search
CPC .. H01B 1/00; H01B 1/20; H01B 1/24; H01M 4/13; H01M 4/505; H01M 4/535; H01M 4/62
See application file for complete search history.

(56) References Cited

U.S. PATENT DOCUMENTS

| | | | |
|---|---|---|---|
| 2006/0222952 A1 | 10/2006 | Kono et al. | |
| 2011/0159363 A1 | 6/2011 | Tanaka et al. | |
| 2015/0380725 A1* | 12/2015 | Mine | H01M 4/0471 429/231.8 |
| 2016/0020466 A1* | 1/2016 | Ulbrich | H01M 4/525 252/511 |
| 2018/0226650 A1 | 8/2018 | Yoo et al. | |
| 2019/0044150 A1 | 2/2019 | Kim et al. | |
| 2020/0194775 A1* | 6/2020 | Umetsu | H01M 4/505 |
| 2021/0226222 A1* | 7/2021 | Morita | C01B 32/174 |
| 2021/0305576 A1* | 9/2021 | Konishi | C01B 32/192 |
| 2022/0190380 A1 | 6/2022 | Hirakawa et al. | |
| 2022/0336795 A1 | 10/2022 | Aoki et al. | |

FOREIGN PATENT DOCUMENTS

| | | | |
|---|---|---|---|
| EP | 4068318 | * 10/2022 | |
| JP | 2011-134575 A | 7/2011 | |
| JP | 2018-533175 A | 11/2018 | |
| JP | 2020-019705 A | 2/2020 | |
| KR | 20160011558 A | * 2/2016 | |
| WO | WO 2016/030710 A1 | * 3/2016 | |
| WO | 2017/038628 A1 | 3/2017 | |
| WO | 2019/098197 A1 | 5/2019 | |
| WO | 2020/004095 A1 | 1/2020 | |
| WO | WO-2021106660 A1 | * 6/2021 | ............ C09D 5/24 |
| WO | 2021/140899 A1 | 7/2021 | |

OTHER PUBLICATIONS

English language translation of form PCT/ISA/237 (mailed Jun. 14, 2022).*
International Search Report dated Jun. 14, 2022, issued in counterpart International Appication No. PCT/JP2022/016073 (5 pages).
Non-Final Office Action dated Oct. 22, 2024, issued in U.S. Appl. No. 18/284,686. (17 pages).
English translation of Written Opinion dated May 24, 2022, issued in International application No. PCT/JP2022/016082 (counterpart to U.S. Appl. No. 18/284,686). (7 pages).

(Continued)

Primary Examiner — Mark Kopec
(74) Attorney, Agent, or Firm — WHDA, LLP

(57) ABSTRACT

A disclosed conductive material dispersion liquid includes a conductive material including carbon nanotubes, dispersants, and a polar aprotic solvent. The dispersants include a polyvinylpyrrolidone-based compound and a cellulose derivative.

10 Claims, No Drawings

(56) References Cited

OTHER PUBLICATIONS

International Search Report dated May 24, 2022, issued in International application No. PCT/JP2022/016082 (counterpart to U.S. Appl. No. 18/284,686), with English translation. (7 pages).

* cited by examiner

CONDUCTIVE MATERIAL LIQUID DISPERSION, POSITIVE ELECTRODE SLURRY FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

CROSS REFERENCE TO RELATED APPLICATIONS

This Application is the National Stage of International Application No. PCT/JP2022/016073, filed on Mar. 30, 2022, which claims priority from Application No. 2021-061192 filed on Mar. 31, 2021 in Japan. The entire contents of these applications are incorporated herein by reference in their entirety.

TECHNICAL FIELD

The present disclosure relates to a conductive material dispersion liquid, a positive-electrode slurry for a nonaqueous electrolyte secondary battery, a positive electrode for a nonaqueous electrolyte secondary battery, and a nonaqueous electrolyte secondary battery.

BACKGROUND ART

Nonaqueous electrolyte secondary batteries have high output power and high energy density, and accordingly have various uses such as consumer uses and in-vehicle uses. In recent years, there are demands for nonaqueous electrolyte secondary batteries that have higher durability and higher energy density.

Technology for increasing the conductivity of a positive-electrode mixture layer is known as a method for increasing performance of nonaqueous electrolyte secondary batteries. For example, conductive materials such as carbon nanotubes have been conventionally added to a positive-electrode mixture. In the case where a conductive material that is likely to aggregate, such as carbon nanotubes, is used, it is important to uniformly disperse the conductive material in the positive-electrode mixture layer.

PTL 1 (Japanese Laid-Open Patent Publication No. 2020-19705) discloses, as a dispersion liquid to be used to produce an electrode, "a carbon nanotube dispersion including: bundle-type carbon nanotubes; a dispersion medium; and partially hydrogenated nitrile rubber having a residual double bond (RDB) value of 0.5% by weight to 40% by weight calculated according to the following Mathematical Formula 1, wherein dispersed particle diameters of the carbon nanotubes have particle size distribution $D_{50}$ of 3 μm to 10 μm: [Mathematical Formula 1] RDB % by weight=BD weight/(BD weight+HBD weight)×100, where BD means a conjugated diene-derived structure unit and HBD means a hydrogenated conjugated diene-derived structure unit."

CITATION LIST

Patent Literature

PTL 1: Japanese Laid-Open Patent Publication No. 2020-19705

SUMMARY OF INVENTION

Technical Problem

Currently there are demands for further improvement in properties of a positive electrode in which a conductive material such as carbon nanotubes is used. Under the above circumstances, an object of the present disclosure is to provide a dispersion liquid in which carbon nanotubes are dispersed with high dispersibility.

Solution to Problem

An aspect of the present disclosure relates to a conductive material dispersion liquid. The conductive material dispersion liquid includes: a conductive material including carbon nanotubes; dispersants; and a polar aprotic solvent. The dispersants include a polyvinylpyrrolidone-based compound and a cellulose derivative.

Another aspect of the present disclosure relates to a positive-electrode slurry for a nonaqueous electrolyte secondary battery including the conductive material dispersion liquid according to the present disclosure and a lithium-containing transition metal oxide.

Another aspect of the present disclosure relates to a positive electrode for a nonaqueous electrolyte secondary battery produced with use of the positive-electrode slurry according to the present disclosure.

Another aspect of the present disclosure relates to a nonaqueous electrolyte secondary battery including the positive electrode for a nonaqueous electrolyte secondary battery according to the present disclosure.

Advantageous Effects of Invention

According to the present disclosure, it is possible to obtain a dispersion liquid in which carbon nanotubes are dispersed with high dispersibility. Furthermore, according to the present disclosure, it is possible to obtain a positive-electrode slurry, a positive electrode for a nonaqueous electrolyte secondary battery, and a nonaqueous electrolyte secondary battery that are produced with use of the dispersion liquid.

Although novel features of the present invention are described in the appended claims, the following detailed description referring to the drawings together with other objects and features of the present invention will further facilitate understanding of both the configuration and the content of the present invention.

DESCRIPTION OF EMBODIMENTS

The following describes an embodiment according to the present disclosure referring to an example, but the present disclosure is not limited to the following example. In the following description, specific numerical values and materials are described as examples, but other numerical values and materials may be applied as long as effects of the present disclosure can be achieved. In the present specification, the wording "from a numerical value A to a numerical value B" refers to a range that includes the numerical values A and B, and can be read as "the numerical value A or more and the numerical value B or less".

(Conductive Material Dispersion Liquid)

A conductive material dispersion liquid according to the present embodiment includes a conductive material, dispersants, and a polar aprotic solvent. The conductive material includes carbon nanotubes. Hereinafter, the conductive material dispersion liquid according to the present embodiment may be referred to as a "dispersion liquid (D)". The dispersants include a polyvinylpyrrolidone-based compound and a cellulose derivative.

Carbon nanotubes easily aggregate, and accordingly, it is important to disperse carbon nanotubes with high dispersibility. If carbon nanotubes included in the dispersion liquid aggregate, the carbon nanotubes remains in the aggregated state in a positive-electrode mixture layer of an electrode plate produced with use of the dispersion liquid. Therefore, it is important to disperse carbon nanotubes with high dispersibility in the dispersion liquid.

There are a large number of dispersants that are added to dispersion liquids to improve dispersibility of carbon nanotubes. Also, there are countless blending ratios between dispersants. Accordingly, there are countless combinations of types of dispersants and blending ratios between the dispersants, and sufficient examination has not been carried out on effects obtained by the combinations. Also, it is difficult for those skilled in the art to predict effects that can be obtained by combinations of types and blending ratios of dispersants. If effects that can be obtained by the combinations are predictable, it is possible to determine the optimal combination without carrying out experiments. However, actually, it is difficult to predict effects that can be obtained by the combinations. The inventors of the present invention carried out examination and newly found a combination with which a unique effect can be obtained. Specifically, the inventors of the present invention found that, when carbon nanotubes and additives (dispersants) are mixed at a predetermined ratio, the dispersibility of carbon nanotubes significantly increases as indicated by Examples. The present invention is based on this finding.

(Dispersant)

Examples of the cellulose derivative used as the dispersant include alkyl cellulose such as methyl cellulose, hydroxyalkyl cellulose, and alkali metal salts thereof. Examples of alkali metals forming the alkali metal salts include potassium and sodium. Among these, methyl cellulose, ethyl cellulose, and hydroxypropyl methyl cellulose are preferable. The cellulose derivative may have a weight-average molecular weight within a range from 1000 to 1000000 (for example, a range from 10000 to 1000000). The weight-average molecular weight of the cellulose derivative may be within a range from 10000 to 200000, in which case, effects of the configuration according to the present disclosure increase.

The polyvinylpyrrolidone-based compound is at least one selected from the group consisting of polyvinylpyrrolidone and polyvinylpyrrolidone derivatives. Examples of polyvinylpyrrolidone derivatives include polymers formed as a result of a hydrogen atom included in polyvinylpyrrolidone being replaced by another substituent, such as alkylated polyvinylpyrrolidone. It is possible to use only polyvinylpyrrolidone or a copolymer of vinylpyrrolidone and another monomer, as the polyvinylpyrrolidone-based compound. Examples of the other monomer include a styrene-based monomer and a vinyl acetate-based monomer.

The polyvinylpyrrolidone-based compound may have a weight-average molecular weight within a range from 1000 to 2000000. The weight-average molecular weight of the polyvinylpyrrolidone-based compound may be within a range from 5000 to 1000000, in which case, the effects of the configuration according to the present disclosure increase.

The amount of the cellulose derivative included in the dispersion liquid (D) is preferably within a range from 30 to 400 parts by mass (for example, 100 to 400 parts by mass or 300 to 400 parts by mass) with respect to 100 parts by mass of the polyvinylpyrrolidone-based compound. When the amount is within the range from 30 to 400 parts by mass, particularly high effects can be obtained as shown in the Examples.

Regarding dispersion of carbon nanotubes, the polyvinylpyrrolidone-based compound has good wettability for carbon nanotubes and accordingly has a certain effect on improvement of the dispersibility, but steric hindrance of the polyvinylpyrrolidone-based compound is low, and therefore, there is a problem in long-term dispersion stability.

On the other hand, the following unique effect can be achieved when the polyvinylpyrrolidone-based compound and the cellulose derivative are used in combination. The polyvinylpyrrolidone-based compound functions not only as the dispersant but also as a dispersion aid for the cellulose derivative, which realizes long-term dispersion stability due to its high steric hindrance but has low affinity to the polar aprotic solvent, and therefore, the dispersibility and long-term dispersion stability can be realized at the same time.

The dispersants may further include nitrile-based rubber. Examples of the nitrile-based rubber include a copolymer of monomers including acrylonitrile and a diene (for example, butadiene). Examples of the nitrile-based rubber include acrylonitrile-based rubber such as acrylonitrile-butadiene rubber (NBR) and hydrogenated acrylonitrile-butadiene rubber (H-NBR). When the dispersants include the polyvinylpyrrolidone-based compound, the cellulose derivative, and the nitrile-based rubber, particularly high effects can be obtained as shown in the Examples.

The amount of the nitrile-based rubber included in the dispersion liquid (D) is preferably within a range from 30 to 500 parts by mass (for example, 100 to 300 parts by mass) with respect to 100 parts by mass of the polyvinylpyrrolidone-based compound. When the amount is within the range from 100 to 300 parts by mass, particularly high effects can be obtained as shown in the Examples.

In a case where a positive-electrode slurry for a nonaqueous electrolyte secondary battery (for example, a lithium ion secondary battery) is produced by combining the dispersion liquid (D) and a lithium-containing complex oxide, it is preferable to use the cellulose derivative and the nitrile-based rubber, which are chemically stable, in addition to the polyvinylpyrrolidone-based compound. Owing to the presence of the cellulose derivative and the nitrile-based rubber, a side reaction of a lithium component included in a positive-electrode active material is suppressed, and the long-term dispersion stability of the positive-electrode slurry improves. In particular, a side reaction is likely to occur in the case of a positive-electrode active material that has a high proportion of Ni and is recently often used in nonaqueous electrolyte secondary batteries due to its high energy density. Accordingly, particularly high effects can be obtained by the combination of the materials described above.

The dispersion liquid (D) may further include polyvinylidene fluoride. Note that polyvinylidene fluoride is not included in examples of the dispersants. The amount of polyvinylidene fluoride may be within a range from 50 to 5000 parts by mass (for example, 200 to 2000 parts by mass) with respect to 100 parts by mass of the polyvinylpyrrolidone-based compound.

Weight-average molecular weights of the acrylonitrile-based rubber and polyvinylidene fluoride are not particularly limited and are only required to be within a range that allows the acrylonitrile-based rubber and polyvinylidene fluoride to be used as additives in the dispersion liquid (D). For example, the weight-average molecular weight of the nitrile-based rubber may be within a range from 5000 to 2000000. The weight-average molecular weight of polyvinylidene fluoride may be within a range from 100000 to 3000000.

The dispersion liquid (D) may also include a dispersant other than those described above. A known dispersant may be used as the other dispersant. However, the proportion of the other dispersant in all dispersants is low, and is 10 mass % or less, for example.

(Conductive Material)

Examples of the conductive material include conductive materials containing carbon. Examples of conductive materials containing carbon include conductive carbon particles such as carbon black, graphene, and fibrous conductive carbon materials such as carbon nanofibers and carbon nanotubes. The conductive material included in the dispersion liquid (D) includes carbon nanotubes as an essential component. In the following description, fibrous conductive carbon materials may also be referred to as "carbon fibers". Preferable carbon fibers are carbon nanotubes, and accordingly, "carbon fibers" referred to in the following description may be read as "carbon nanotubes". The proportion of carbon nanotubes in all conductive materials is 50 mass % or more, for example, and preferably within a range from 66 to 100 mass % (for example, 80 to 100 mass % or 90 to 100 mass %).

The content of carbon nanotubes in the dispersion liquid (D) is preferably within a range from 0.1 mass % to 10 mass %.

When carbon nanotubes are used as the conductive material, it is possible to obtain particularly high effects by using the dispersants including the polyvinylpyrrolidone-based compound and the cellulose derivative as shown in the Examples.

Carbon nanotubes are small carbon fibers having a fiber diameter in the order of nanometer. In the case where carbon nanotubes are used as the conductive material, the resistance of the positive-electrode mixture layer can be reduced even with a small amount of carbon nanotubes.

The carbon nanotubes may have an average fiber length of 1 μm or more. In this case, an aspect ratio (a ratio of the length of a fiber to an outer diameter of the fiber) of the carbon nanotubes, which are carbon fibers, is very large. Carbon fibers that have a large aspect ratio realize line contact with the active material and a current collector, rather than point contact. The DC resistance (DCR) of a battery improves as a result of carbon fibers having excellent conductivity being present between particles of the positive-electrode active material and forming line contact with the particles.

Additionally, carbon fibers exhibit excellent conductivity even when added in a small amount. Carbon fibers occupy only a small volume in the positive-electrode mixture layer, and therefore, it is possible to increase the proportion of the positive-electrode active material in the positive-electrode mixture layer to increase the capacity. Also, with use of carbon fibers, it is possible to suppress a problem (an increase in the resistance) that occurs when the thickness of the mixture layer is increased or the mixture layer is compressed as described above. Therefore, it is possible to increase the thickness of the mixture layer or further compress the mixture layer when carbon fibers are used. On the other hand, when the capacity is further increased as described above, it is particularly important to increase the dispersibility of carbon nanotubes in the carbon nanotube dispersion liquid.

The average fiber length of carbon fibers is determined through image analysis with use of a scanning electron microscope (SEM). The average fiber length of carbon fibers is determined by measuring lengths of arbitrarily selected carbon fibers (for example, 100 carbon fibers) and calculating the arithmetic mean of the measured lengths, for example. The term fiber length refers to the length of a linearly extended carbon fiber. The average fiber diameter (outer diameter) of carbon fibers is 20 nm or less, for example, and may be 15 nm or less. The average fiber diameter of carbon fibers is determined through image analysis with use of a transmission electron microscope (TEM). The average fiber diameter of carbon fibers is determined by measuring fiber diameters of arbitrarily selected carbon fibers (for example, 100 carbon fibers) and calculating the arithmetic mean of the measured diameters, for example. The term fiber diameter refers to the length of a fiber in a direction perpendicular to the fiber length direction.

It is possible to use any of single walled carbon nanotubes, double walled carbon nanotubes, and multi walled carbon nanotubes, and two or more of these types of carbon nanotubes may also be used. It is preferable to use carbon nanotubes having an average fiber diameter of 20 nm or less because a significant effect can be obtained with a small amount of such carbon nanotubes. The average fiber length of carbon nanotubes is preferably 1 μm or more from the viewpoint of assuring electron conductivity in the positive electrode. On the other hand, an upper limit is not set for the fiber length as long as carbon nanotubes are arranged appropriately within the positive electrode. In view of the fact that the positive-electrode active material commonly has a particle diameter of 1 μm or more and 20 μm or less, it is thought that a fiber length similar to the particle diameter is appropriate. That is, the average fiber length of carbon nanotubes may be 1 μm or more and 20 μm or less, for example.

The amount of dispersants included in the dispersion liquid (D) may be within a range from 30 to 300 parts by mass (for example, 30 to 50 parts by mass) with respect to 100 parts by mass of carbon nanotubes.

(Polar Aprotic Solvent)

The dispersion liquid (D) includes the polar aprotic solvent (polar aprotic dispersion medium) as a dispersion medium. Examples of the polar aprotic solvent includes N-methyl-2-pyrrolidone (hereinafter may be referred to as "NMP"). The dispersion medium may be constituted by a single type of liquid or may be a mixture of a plurality of types of liquid. In the case where the dispersion medium includes NMP, the proportion of NMP in the dispersion medium may be within a range from 50 to 100 mass % (for example, 80 to 100 mass %). The dispersion medium may be constituted by NMP alone.

The proportion of the polar aprotic solvent (dispersion medium) in the dispersion liquid (D) can be selected in view of the dispersibility of carbon nanotubes and the stability of the dispersion liquid (D). The proportion of the polar aprotic solvent in the dispersion liquid (D) may be within a range from 10 to 99 parts by mass.

The dispersion liquid (D) according to the present embodiment satisfies the following condition (1). The dispersion liquid (D) preferably satisfies at least one of the following conditions (2) to (6). The conditions (2) to (6) can be combined suitably.

(1) The dispersion liquid (D) includes dispersants, and the dispersants include the polyvinylpyrrolidone-based compound and the cellulose derivative.

(2) The mass ratio between components included in the dispersion liquid (D) may be: polyvinylpyrrolidone-based compound:cellulose derivative:acrylonitrile-based rubber: polyvinylidene fluoride=100:30 to 400:0 to 300:0 to 5000. The ratios of the components other than the polyvinylpyrrolidone-based compound relative to the polyvinylpyrrolidone-based compound may be changed to the ranges described above.

(3) Examples of the cellulose derivative include methyl cellulose, ethyl cellulose, and hydroxypropyl methyl cellulose.

(4) The dispersants include acrylonitrile-based rubber. The acrylonitrile-based rubber may be NBR or H-NBR, for example.

(5) The dispersion liquid (D) includes polyvinylidene fluoride.

(6) The polyvinylpyrrolidone-based compound is polyvinylpyrrolidone.

The dispersion liquid (D) according to the present embodiment can be used to form a mixture layer (an active material layer) of an electrode of a battery. For example, the dispersion liquid (D) can be used to form a mixture layer of an electrode (a positive electrode or a negative electrode) of a nonaqueous electrolyte secondary battery, and is particularly preferably used to form a positive-electrode mixture layer. At least a portion of the dispersants included in the dispersion liquid (D) may function as a binder in the mixture layer.

(Positive-Electrode Slurry)

When a positive-electrode mixture layer for a nonaqueous electrolyte secondary battery is to be formed with use of the dispersion liquid (D), first, a positive-electrode slurry (a positive-electrode slurry for a nonaqueous electrolyte secondary battery) is prepared with use of the dispersion liquid (D). The positive-electrode slurry can be prepared by mixing a positive-electrode active material (a positive-electrode active material for a nonaqueous electrolyte secondary battery), the dispersion liquid (D), and other materials (other components such as a thickener or another dispersion medium) that are used as necessary. In other words, it can be said that the positive-electrode slurry includes the dispersion liquid (D). From another viewpoint, the positive-electrode slurry may be a slurry that contains the components of the dispersion liquid (D) and the positive-electrode active material. That is, an example of the positive-electrode slurry includes the positive-electrode active material, the conductive material including carbon nanotubes, the dispersants, and the polar aprotic solvent, and the dispersants include the polyvinylpyrrolidone-based compound and the cellulose derivative. There is no particular limitation on the positive-electrode active material. The active material is only required to be usable in the battery that is to be produced. A known active material can be used. Examples of the positive-electrode active material include a complex oxide that contains lithium and a transition metal. An example of the positive-electrode slurry according to the present disclosure includes the conductive material dispersion liquid (the dispersion liquid (D)) according to the present disclosure and a lithium-containing transition metal oxide.

(Positive Electrode for Nonaqueous Electrolyte Secondary Battery)

An example of a positive electrode for a nonaqueous electrolyte secondary battery according to the present disclosure is a positive electrode produced with use of the positive-electrode slurry described above. There is no limitation on the method for producing the positive electrode with use of the positive-electrode slurry, and a known method can be used. For example, a positive electrode including a positive-electrode mixture layer is obtained by applying the positive-electrode slurry to a surface of a positive-electrode current collector to form a coating film, and thereafter drying the coating film. The dried coating film may be pressed as necessary. The positive-electrode mixture layer can include the components included in the positive-electrode slurry, but at least a portion of the solvent may be removed. An example of the positive-electrode mixture layer includes the positive-electrode active material, the conductive material including carbon nanotubes, and the dispersants, and the dispersants include the polyvinylpyrrolidone-based compound and the cellulose derivative. The positive-electrode mixture layer may be formed on one surface of the positive-electrode current collector or both surfaces of the positive-electrode current collector. The positive-electrode mixture layer can include a thickener and the like as optional components. Known materials may be used as the optional components. The ratio between the components included in the positive-electrode slurry is reflected in the ratio between the components included in the positive-electrode mixture layer. Therefore, it is possible to change the ratio between the components included in the positive-electrode mixture layer by changing the ratio between the components included in the positive-electrode slurry.

There is no particular limitation on the positive-electrode current collector, and a known current collector that can be used in a positive electrode of a nonaqueous electrolyte secondary battery can be used. Examples of materials of the positive-electrode current collector include stainless steel, aluminum, an aluminum alloy, and titanium.

Examples of the positive-electrode active material include complex oxides that contain lithium and a transition metal. Such complex oxides may also be referred to as "lithium-containing complex oxides" in this specification. Lithium-containing complex oxides may have a layered structure (for example, a rock salt crystal structure). The positive-electrode active material may be a lithium-containing complex oxide represented by a compositional formula $Li_yNi_xM_{1-x}O_2$ (where x and y satisfy $0.8 \leq x \leq 1$ and $0 < y \leq 1.2$, and M includes at least one element selected from the group consisting of Co, Al, Mn, Fe, Ti, Sr, Ca, and B). M may be at least one element selected from the group consisting of Co, Al, Mn, Fe, Ti, Sr, Ca, and B. In particular, M preferably includes at least one element selected from the group consisting of Co, Mn, Al, and Fe. In the above example, M is typically a metal element. From the viewpoint of stability of the crystal structure, Al may be contained as the element M. Note that the value y representing a compositional ratio of lithium increases and decreases as the battery is charged and discharged. A specific example of such a complex oxide is a lithium-nickel-cobalt-aluminum complex oxide (for example, $LiNi_{0.9}Co_{0.05}Al_{0.05}O_2$).

(Nonaqueous Electrolyte Secondary Battery)

A nonaqueous electrolyte secondary battery according to the present disclosure includes the positive electrode for a nonaqueous electrolyte secondary battery according to the present disclosure. More specifically, the nonaqueous electrolyte secondary battery according to the present disclosure includes the positive electrode for a nonaqueous electrolyte secondary battery according to the present disclosure, a negative electrode, and a nonaqueous electrolyte, and further includes other constitutional elements (a separator, a case, etc.) as necessary. There is no particular limitation on the constitutional elements other than the positive electrode, and known constitutional elements may be used as long as the elements can be used with a nonaqueous electrolyte. For example, it is possible to use a negative electrode that includes a negative-electrode current collector and a negative-electrode mixture layer on a surface of the negative-electrode current collector. The negative-electrode mixture layer includes a negative-electrode active material as an essential component, and can include a binder, a thickener, a conductive material, and the like as optional components. As the negative-electrode active material, it is possible to use metallic lithium, a lithium alloy, or the like, but a material that can absorb and release lithium ions electrochemically is preferably used. Examples of such materials include carbonaceous materials and Si-containing materials. The negative-electrode active material may include a Si-containing material or may be a Si-containing material. The negative electrode may include a negative-electrode active material alone or two or more negative-electrode active materials in combination.

(Nonaqueous Electrolyte)

The nonaqueous electrolyte (nonaqueous electrolyte solution) includes a solvent and a solute dissolved in the solvent. The solute is an electrolyte salt that dissociates into ions in the electrolyte solution. The solute may include a lithium salt, for example. Components of the electrolyte solution other than the solvent and the solute are additives. The electrolyte solution may include various additives. It is possible to use a nonaqueous electrolyte that is used in nonaqueous electrolyte secondary batteries.

(Separator)

A separator is arranged between the positive electrode and the negative electrode. The separator has high ion permeability, appropriate mechanical strength, and insulating properties. It is possible to use a microporous thin film, woven cloth, nonwoven cloth, or the like as the separator. It is preferable to use a polyolefin such as polypropylene or polyethylene as the material of the separator.

An example of the structure of the nonaqueous electrolyte secondary battery is a structure including an electrode group that is formed by winding the positive electrode and the negative electrode with the separator arranged therebetween and is housed in an outer covering body together with the nonaqueous electrolyte. However, there is no limitation to this structure, and an electrode group of another form may also be used. For example, it is also possible to use a stacked electrode group formed by stacking the positive electrode and the negative electrode with the separator arranged therebetween. The shape of the nonaqueous electrolyte secondary battery is not limited, and may be a cylindrical shape, a rectangular shape, a coin shape, a button shape, or a laminate shape, for example.

EXAMPLES

The following specifically describes the present disclosure based on examples, but the present disclosure is not limited by the following examples.

In the examples, a plurality of conductive material dispersion liquids were prepared while changing types and amounts of dispersants. Then, the conductive material dispersion liquids were evaluated.

(Preparation of Conductive Material Dispersion Liquid)

First, dispersion liquids A1 to A5, C1, and C2 were prepared by mixing carbon nanotubes (a conductive material) and dispersants at predetermined mass ratios and dispersing the mixtures in N-methyl-2-pyrollidone (NMP). The carbon nanotubes had an average fiber length of 1 μm and an average fiber diameter of 10 nm. The carbon nanotubes and the dispersants were mixed at the ratios shown in Table 1. Also, Table 1 shows ratios between components of the dispersants. The proportion of carbon nanotubes in the dispersion liquids was about 5 mass %.

Each of the obtained dispersion liquids was applied to a plate having insulating properties, and then dried to form a coating film. A sheet resistance of the coating film was measured with use of four-terminal sensing.

Next, positive-electrode slurries were produced with use of the dispersion liquids. Specifically, a plurality of positive-electrode slurries SA1 to SA5, SC1, and SC2 were prepared by mixing each of the dispersion liquids and a positive-electrode active material. Particles of a composite oxide ($LiNi_{0.9}Co_{0.05}Al_{0.05}O_2$) containing lithium and a transition metal were used as the positive-electrode active material. Then, settleability of the produced positive-electrode slurries was evaluated.

Settleability of the positive-electrode slurries was evaluated with use of a centrifugal settling method. Each of the positive-electrode slurries produced as described above was placed in a centrifugal separator, and subjected to centrifugal separation at a rotation speed of 1000 rpm for 1 hour. A supernatant liquid and sediment collected from each sample subjected to centrifugal separation were dried to evaluate solid fractions, and a difference between the solid fraction of the supernatant liquid and the solid fraction of the sediment was taken as a value of the settleability.

Table 1 shows some of the conditions under which the dispersion liquids were prepared and evaluation results of the dispersion liquids and the positive-electrode slurries. Note that the dispersion liquids C1 and C2 are comparative examples.

TABLE 1

| Dispersion liquid/slurry | Dispersant/CNT (mass ratio) | Dispersant (parts by mass) | | | Evaluation results | |
| | | PVP | Cellulose derivative | H-NBR | Sheet resistance of coating film | Settleability of positive-electrode slurry |
| --- | --- | --- | --- | --- | --- | --- |
| C1/SC1 | 0.5 | 100 | — | — | 100% | 332% |
| C2/SC2 | 0.5 | — | 100 | — | 74% | 241% |
| A1/SA1 | 0.5 | 100 | 30 | — | 82% | 100% |
| A2/SA2 | 0.5 | 100 | 300 | — | 70% | 209% |
| A3/SA3 | 0.4 | 100 | 400 | — | 58% | 141% |
| A4/SA4 | 0.3 | 100 | 300 | 200 | 58% | 127% |
| A5/SA5 | 0.4 | 100 | 300 | 200 | 34% | 32% |

CNT represents carbon nanotubes.
PVP represents polyvinyl pyrrolidone.
Cellulose derivative is hydroxypropyl methyl cellulose.

The values of sheet resistance shown in Table 1 are relative values when the sheet resistance of the coating film formed from the dispersion liquid C1 is taken as 100%. A smaller value of sheet resistance indicates higher dispersibility of carbon nanotubes. The values of settleability of the positive-electrode slurries shown in Table 1 are relative values when a measured value of the slurry SA1 is taken as 100%. A smaller value of settleability indicates lower settleability (i.e., higher dispersibility and higher dispersion stability).

As shown in Table 1, in the cases where the polyvinylpyrrolidone-based compound and the cellulose derivative were used as dispersants, the sheet resistance of the coating film decreased and the dispersibility in the positive-electrode slurry increased. Particularly good results were obtained in the cases where the polyvinylpyrrolidone-based compound, the cellulose derivative, and acrylonitrile-based rubber were used as dispersants.

As described above, it is clear that the properties are improved by a synergistic effect of polyvinylpyrrolidone (polyvinylpyrrolidone-based compound) and hydroxypropyl methyl cellulose (cellulose derivative). It is thought that this effect becomes particularly high when polyvinylpyrrolidone, the cellulose derivative, and H-NBR are used in combination.

INDUSTRIAL APPLICABILITY

The present disclosure is applicable to a conductive material dispersion liquid, a positive-electrode slurry, a positive electrode for a nonaqueous electrolyte secondary battery, and a nonaqueous electrolyte secondary battery.

Although the present invention has been described in terms of the presently preferred embodiment, it is to be understood that such a disclosure is not to be interpreted as limiting. Various alterations and modifications will no doubt become apparent to those skilled in the art to which the present invention pertains, after having read the above disclosure. Accordingly, the appended claims should be construed as covering all alterations and modifications that fall within the true spirit and scope of the present invention.

The invention claimed is:

1. A positive-electrode slurry for a nonaqueous electrolyte secondary battery, comprising:
    a conductive material dispersion liquid comprising:
        a conductive material including carbon nanotubes;
        dispersants; and
        a solvent,
            wherein the dispersants include a polyvinylpyrrolidone-based compound and a cellulose derivative,
            the solvent is a polar aprotic solvent, and
            the cellulose derivative is at least one selected from a group consisting of alkyl cellulose, hydroxyalkyl cellulose, and alkali metal salts thereof; and
    a lithium-containing transition metal oxide.

2. A positive electrode for a nonaqueous electrolyte secondary battery produced with use of the positive-electrode slurry according to claim 1.

3. A nonaqueous electrolyte secondary battery comprising the positive electrode for a nonaqueous electrolyte secondary battery according to claim 2.

4. The positive-electrode slurry according to claim 1, wherein the cellulose derivative is included in an amount of 30 to 400 parts by mass with respect to 100 parts by mass of the polyvinylpyrrolidone-based compound.

5. The positive-electrode slurry according to claim 4, wherein the cellulose derivative is included in an amount of 100 to 400 parts by mass with respect to 100 parts by mass of the polyvinylpyrrolidone-based compound.

6. The positive-electrode slurry according to claim 1, wherein the dispersants further include nitrile-based rubber.

7. The positive-electrode slurry according to claim 6, wherein the nitrile-based rubber is included in an amount of 100 to 300 parts by mass with respect to 100 parts by mass of the polyvinylpyrrolidone-based compound.

8. The positive-electrode slurry according to claim 1, wherein the carbon nanotubes are included in an amount of 0.1 mass % to 10 mass %.

9. The positive-electrode slurry according to claim 1, wherein the dispersants are included in an amount of 30 to 300 parts by mass with respect to 100 parts by mass of the carbon nanotubes.

10. The positive-electrode slurry according to claim 1, wherein the carbon nanotubes have an average fiber diameter of 20 nm or less.

* * * * *